(12) United States Patent
Sena

(10) Patent No.: US 7,051,475 B1
(45) Date of Patent: May 30, 2006

(54) ADJUSTABLE TRAY SIZE AUTOMATIC SEEDLING PLANTING APPARATUS

(76) Inventor: Gil A Sena, 442 Callisto La., Nipomo, CA (US) 93444

( * ) Notice: Subject to any disclaimer, the term of this patent is extended or adjusted under 35 U.S.C. 154(b) by 0 days.

(21) Appl. No.: 10/908,863

(22) Filed: May 30, 2005

Related U.S. Application Data

(62) Division of application No. 10/660,922, filed on Sep. 12, 2003.

(51) Int. Cl.
 *A01G 9/08* (2006.01)
(52) U.S. Cl. .................. 47/1.01 P; 111/105
(58) Field of Classification Search ............ 47/1.01 P, 47/58.1 SE, 1.01 R; 111/100, 101, 102, 111/104, 105
See application file for complete search history.

(56) References Cited

U.S. PATENT DOCUMENTS

| | | |
|---|---|---|
| 4,454,829 A | 6/1984 | Sena |
| 4,616,578 A | 10/1986 | Talbott |
| 4,854,802 A | 8/1989 | Degroot |
| 4,893,571 A | 1/1990 | Hakli et al. |
| 5,209,170 A | 5/1993 | Kobayashi |
| 5,431,116 A | 7/1995 | Gao |
| 5,445,089 A | 8/1995 | Houng et al. |
| 5,477,791 A | 12/1995 | Nakashima et al. |
| 5,564,352 A | 10/1996 | Kondo et al. |
| 5,644,999 A | 7/1997 | Williames |
| 5,676,072 A | 10/1997 | Williames |
| 5,765,491 A | 6/1998 | Brower |
| 5,868,086 A | 2/1999 | Williames |
| 6,327,986 B1 | 12/2001 | Williames |
| 6,591,766 B1 | 7/2003 | Williames |

*Primary Examiner*—T. Nguyen
(74) *Attorney, Agent, or Firm*—William Keyworth; Bill & Mary Lou Inc.

(57) ABSTRACT

A farm apparatus for automatically planting seedlings that have been sown in growing trays configured with multiple rows of seedling growing cells. Trays may be of various dimensions and seedling configurations. The apparatus may be adjusted in the field to accommodate these different tray sizes and configurations and also provides for adjustment of the planted seedling configuration. The apparatus is drawn by a common farm tractor and is powered by the tractor. In operation the apparatus continuously moves over a growing field while individually extracting seedlings from the trays and planting them in the desired array.

2 Claims, 7 Drawing Sheets

ADJUSTABLE TRAY SIZE AUTOMATIC SEEDLING PLANTING APPARATUS

CROSS-REFERENCE TO RELATED APPLICATIONS

This application is a division of pending U.S. application 10/660,922 "Adjustable Tray Size Automatic Seedling Planting Apparatus" filed on Sep. 12, 2003 that is incorporated herein by reference.

STATEMENT REGARDING FEDERALLY SPONSORED RESEARCH AND DEVELOPMENT

Not Applicable.

REFERENCE TO A MICROFICHE APPENDIX

Not Applicable.

BACKGROUND OF THE INVENTION

This invention is an apparatus for planting seedlings in soil in commercial growing fields. This type of agriculture is sometimes called field transplant production. Growing crops from seedlings has been shown to improve crop yields over conventional seeding of growing fields. The seedlings are generally produced in greenhouses in growing media contained in rectangular trays that are returned to the supplier for re-use. Generally, peat containers, clay pots, peat pellets, fiber blocks, and individual plastic pots are no longer used for mass production. Such containers were used in the past and apparatus for planting seedlings in this form are known in the art. The seedlings seeds are sown in a prepared growing medium installed in growing trays. Because of multiple usages, the trays must be properly sanitized after each use or disease problems occur. The resulting seedling root mass and growing media in the seedling cell is frequently called a root ball.

Numerous shapes, sizes and configurations of transplant container trays are available. Trays used in the United States usually have straight row arrangements of inverted pyramid-shaped cells that are open on top, taper toward the bottom and have a hole in the bottom for water passage. Some trays have rounded configurations at the bottom. They may have cell sizes as small as ½-inch square or as large as 2-inches square. The number and spacing of cells in a tray depends on the tray dimensions and cell size.

Different plant species require differing amounts of space, nutrients and water. Smaller cell sizes are desirable to maximize the number of seedlings in a given seedling growing space, which reduces cost. Certain tray cell sizes are more suitable for some plant species than others. Larger cells hold a greater volume of growing media that enables them to retain more water and nutrients. Therefore, transplants growing in larger cells require less frequent watering and fertilizing. This helps reduce the likelihood of a moisture or nutrient stress. Also, larger-celled containers normally produce stockier and earlier plants.

Different seedling suppliers will use differing sizes of seedling trays to match the support frames in the greenhouse. The result is the planter of seedlings who wishes to obtain the best price on seedlings often must deal with a variety of seedling container tray sizes and seedling cell spacing configurations.

Manual planting of seedlings grown in large trays is a labor-intensive activity. Therefore machines to reduce the labor cost have been developed and are available in the art. U.S. Pat. No. 4,616,578 (Talbott), U.S. Pat. No. 4,854,802 (DeGroot), U.S. Pat. No. 4,893,571 (Häkli et al), U.S. Pat. No. 5,209,170 (Kobayashi), U.S. Pat. No. 5,541,116 (Gao), U.S. Pat. No. 5,445,089 (Houng et al), U.S. Pat. No. 5,477,791 (Nakashima et al), U.S. Pat. No. 5,564,352, (Kondo et al), U.S. Pat. No. 5,644,999 (Williames), U.S. Pat. No. 5,676,072 (Williames), U.S. Pat. No. 5,765,491 (Brower), U.S. Pat. No. 5,868,086 (Williames), U.S. Pat. No. 6,327,986 (Williames) and U.S. Pat. No. 6,591,766 (Williames) describe numerous planting machines that require uniform, or special tray sizes and/or cell configurations, or major modifications to the apparatus in order to use a different tray size or configuration. Another fixed tray size planter is described in this inventor's U.S. Pat. No. 4,454,829. What is needed is a seedling planter that is field-adjustable to accommodate different seedling tray sizes and configurations.

SUMMARY OF THE INVENTION

The present invention is an adjustable seedling tray size planting apparatus that automatically removes seedlings individually from the seedling tray and plants them in soil in a prepared growing field. The seedlings are in rectangular trays containing multiple seedling growing cells arranged in essentially straight rows. Each tray cell is essentially square in cross section and tapered with a reduction in the cross-section as the distance from the tray upper surface increases. A common farm tractor with a hydraulic system sensitive to speed powers the apparatus.

The main parts of the apparatus are a frame, a multiplicity of seedling tray holders, a seedling tray advance mechanism operating on each tray holder, a seedling tray holder lateral motion mechanism, a multiplicity of seedling extractors, a multiplicity of seedling chutes, a multiplicity of seedling kicker and planting mechanisms, and a control system. The control system has a seedling planting apparatus control camshaft, and a seedling tray size adjustable control system.

The frame attaches to a tractor and rides on support legs and sliding runners or wheels. It supports the seedling tray holders on a couple of plates with an upper tray holder roller attachment edge and a lower tray holder roller attachment edge between which the seedling tray holder is movably attached by rollers that ride between the edges. The rollers allow the holder to move in the two lateral directions. The other parts of the apparatus are adjustably attached to the frame.

The roller-mounted seedling tray holders have a tray holder adjustment bar, a tray inlet support, a tray intermediate support with a tray contact surface and a roller attachment surface, a lower tray support, a left adjustable tray guide, a right adjustable tray guide, and a multiplicity of tray hold-down strips. The inlet support is attached to the top of the intermediate support such that the two supports provide a transition space for inserting the seedling tray edges into the tray guides with the surface of the tray supported at the hold-down strip locations on the top, and the tray bottom supported by the intermediate support contact surface. As the tray advances into the apparatus, the tray lower support also supports the tray bottom. The tray holder adjustment bar is arranged to adjustably support the tray guides and hold-down strips. The guides being adjusted to fit the tray width, and the hold-down strips being adjusted to contact the tray between seedling cells. The tray holder adjustment bars connect to the tray holder adjustment bar of the adjacent tray holder, so all tray holders simultaneously move in the lateral direction. The means for positioning a seedling extractor apparatus opposite a seedling growing cell opening is provided by the control system using manual control valves described in the detailed description.

The seedling tray advance mechanism has an advance cage with a multiplicity of advance bars, an advance cage operating shaft arranged to connect the advance cages associated with each tray holder so the advance mechanisms of all tray holders also move simultaneously. One advance cage rotation assembly mounted on the advance assembly frame with a drive cylinder drives all advance cages together. The rotation assembly is arranged so motion of the drive cylinder causes the cage rotation assembly to engage an advance cage advance bar and by moving the bar, rotate the advance cage operating shaft. The advance cage bars are arranged such that their axis is parallel to the tray intermediate support contact surface, and further arranged such that one bar of the advance cage projects above the plane of the surface of the tray intermediate support. A seedling tray held in the seedling tray holder is supported along a row of seedling cells at the bottom side of the cells by the protruding advance cage bar. Rotation of the advance cage operating shaft by a cycle of motion of the drive cylinder assembly will rotate the advance bar such that the projecting bar moves below the plane of the surface of the tray intermediate support as the next bar of the cage forcibly touches the seedling cell on the top side such that the tray is moved down as the next bar moves into a position to project above the plane of the surface of the tray intermediate support and support the next row of seedling cells on the bottom side.

The seedling tray lateral motion mechanism has a seedling tray positioner flexibly connected to the seedling tray holders located at the left and right frame sides such that movement of the positioner moves the connected tray holders simultaneously in one of the lateral directions. The lateral motion mechanism has a left adjustable stop mechanism, a right adjustable stop mechanism, both of which activate a limit switch in the control system. These are adjusted, like the tray holders, to fit the tray width. The stop mechanisms activate the limit switch to indicate the appropriate end of the seedling tray to the control system.

Two seedling extractors are installed at each tray holder. Closing an isolation valve connected to the appropriate cam follower switch may turn one of these off, depending on whether it is desired to plant one or two rows of seedlings in the growing field soil between furrows. When 2 rows are being planted, the timing of the cam switches provides for staggering the spacing of the plantings between rows.

Each extractor is adjustably mounted and has a housing, an extension tube with an operating end and an insertion end that is slid into the housing, the extension tube bottom contains a longitudinal slot on the operating end and has a hole for a retaining pin further down the tube from the slot. The extractor extension tube is connected to a drive on the top and has a control rod with an end projection that rides in the bottom slot and extends beyond the end of the slot when the extension tube is fully inserted in the housing. The seedling handler is slid into the extension tube operating end and retained in the extension tube by a pin. The handler has two blades, the end of each configured to grasp seedlings out of the tray cells and the two blades are connected and bent at the opposite end into a U-shape spring so the retaining pin will prevent removal of the handler and the sides of the handler tend to spring outwardly. The handler is bent to provide a sloped portion. The transition between the sloped portion and the seedling grasping portion contains a bend that bears against the extension tube inside wall when this portion is slid into the tube. When the handler is slid out of the extension tube, the sloped portion adds force to the motion.

The seedling extractor handler blade sloped portion has two normal positions, open and closed. In the closed position, where the blade is within the extension tube, the sloped portion is pressing against the extension tube inside wall forcing the opposing blade seedling grasping portions together, so the ends converge and substantially touch. In the open position, the handler blades have the sloped portion outside the extension tube. The sloped portions spring apart moving the opposing blade seedling grasping portions apart so the ends diverge. In this position, the retaining pin is located so that the spring end sliding motion within the extension tube is stopped and the handler blade is retained within the extension tube in the open position.

The seedling extractor drive mechanism has a drive cylinder and piston connected to the housing and extension tube. The connector to the extension tube has a follower pin that rides in a drive track slot. The drive track is shaped so as the drive piston moves to extend the extension tube out of the housing, the drive track slot is at an angle to the vertical and slopes the extension tube up to the horizontal position, and then further drive piston motion moves it on the linear portion of the slot so it moves linearly in the horizontal direction toward the seedling tray, to the extraction position, where the extractor handler blade ends enter a seedling cell of a tray in the tray holder, providing the means for moving the seedling handler blade substantially into a seedling tray cell. The extractor mounting is adjusted for the thickness of the seedling tray cell bottoms to place the extractor end at the bottom of the seedling ball at the end of the drive cylinder piston stroke. Then as the drive piston moves to retract the extension tube, the linear motion removes the extractor handler blade ends from the seedling cell providing the means for moving the seedling handler blade out of the seedling tray cell, then slopes the extension tube in the downward direction toward a chute receiving end opening. The chute opening is large enough to accommodate the range of extractor mounting adjustment.

The extractor remains in the open position until the handler blade ends have entered the seedling cell and are near the bottom of the cell. The continued horizontal motion moves the control rod end against the blade unshaped spring end and continued linear motion moves the extractor handler blade back into the extension tube and into the closed position to grasp the seedling ball providing the means for moving the seedling handler blade to the closed position as the seedling extractor apparatus moves into the seedling tray cell such that the blade grasps the seedling root ball. The drive mechanism then reverses. As the seedling extractor handler blade ends exit the seedling cell, the seedling ball is retained by the extractor handler blade and the seedling ball is removed from the tray cell. The drive track then guides the extractor downward.

The seedling extractor release mechanism provides means for releasing the seedling root ball from the blade with a release bushing, a spring guide rod and a release spring. When the drive mechanism moves the extension tube into the housing in its downward motion, near the end of its motion, the release bushing begins to compress the release spring. The spring force eventually forces the handler blades out of the extension tube and into the open position. The release bushing and spring are sized so this occurs towards the lower end of the track slot. At the same time the handler blade is in the open position, the motion of the control rod end has reached the end of the extension tube and the end then assists in removing the seedling from the handler blade. This end provides the means for removing the seedling root ball from the handler blade in the open position.

The seedling chute receiving end, located below the seedling extractor, guides the seedlings falling from the extractor to the kicker end of the chute. The chute is configured with a reduction in the cross-sectional area with distance from the receiving end. The kicker end has a side slot into which the movable kicker is installed. The kicker has a blade, an operating lever arranged to move the blade, an operating shaft, and a drive cylinder. The drive cylinder is arranged to rotate the kicker drive shaft. The drive cylinder rotates the operating shaft and swings the kicker blade to the planting position, and then it moves in the opposite direction so the kicker blade is returned to the seedling holding position.

The kicker blade has a horizontal portion and a vertical portion, the horizontal portion configured to fit within the chute cross-section at the upper end of the kicker slot so a seedling dropping into the chute will rest on the kicker blade horizontal portion. The vertical portion is configured approximately in the configuration of a seedling tray cell side and it hangs below the chute. Thus the swing motion of the kicker blade out of the chute slot moves the horizontal portion to an angle causing a retained seedling to drop from the chute into the soil furrow below. The kicker return motion brings the vertical portion in contact with the dropped seedling to place it in the vertical position in the soil.

The seedling planting mechanisms are at each seedling chute kicker end, and have a furrow shaper shoe and a furrow closure plate. The furrow shaper shoe is configured with a similar cross-section to a seedling tray cell in the direction of motion of the apparatus. This provides a furrow essentially in the shape of a seedling ball. The shaper blades have a gap between the inside surfaces located just below the chute kicker section also configured in the shape of a seedling tray cell. A seedling which has just been dropped from the chute will fall in this gap and the vertical portion of the kicker will then enter the gap and align the seedling between the inside surfaces of the planting mechanism. The furrow closure plates then guides the soil that has been displaced to form the furrow back into the furrow to complete the planting of the seedling.

The control system consists of a seedling control camshaft having a hydraulic motor, and a seedling tray size adjustable control system. The seedling control camshaft has a cam shaft, a multiplicity of cams, a multiplicity of cam followers, and a multiplicity of cam follower switches. The hydraulic motor is connected by quick disconnect connections to the tractor hydraulic system so that the motor turns at a speed proportional to the speed of the tractor. A throttle control valve allows for manually adjusting the motor speed relative to the tractor speed. The cams are adjustably connected to the camshaft and the camshaft is connected to the motor such that the cams rotate at the speed of the motor. The cam followers move in response to the cam rotations such that they activate the follower switches at each rotation of the camshaft with the timing set by the configuration of the cam surface. The follower switches activate the seedling tray size adjustable control system, the seedling extractor drive mechanisms, and the seedling chute kicker drive mechanism, providing the means for coordinating means for moving the seedling handler with the motion of the seedling tray and the kicker operation. The spacing of the seedlings in the ground may be varied by varying the hydraulic pressure to the camshaft motor to vary the speed of the camshaft which in turn will vary the speed of the removal and planting of seedlings relative to the tractor forward speed.

The seedling tray size adjustable control system has a double acting drive cylinder, a drive cylinder stroke length adjustment, a hydraulic fluid reservoir, a hydraulic double rod end hydraulic piston pump, a double rod end seedling tray positioner, a seedling tray positioner stroke limit switch, two manual control valves, a diverter valve, a seedling tray drop actuation switch, a diverter reset control cylinder, a hydraulic directional control valve and a directional control valve control cylinder. The drive cylinder reciprocating motion is controlled by two of the seedling planting apparatus control camshaft follower switches. The length of the motion is limited by adjustable stops on the stroke length adjustment. The drive cylinder moves the hydraulic piston pump. The pump is fluidly connected to the hydraulic fluid reservoir and the seedling tray positioner. When the pump moves due to a stroke of the drive cylinder, a substantially repeatable volume of hydraulic fluid is delivered to the seedling tray positioner at each stroke. This volume is set by the stroke length adjustment so the seedling tray positioner is moved the distance of one seedling tray cell at each stroke. This allows the extraction of one seeding from each tray by the extractor before the tray holder is moved to the next seedling tray cell by the next drive motor stroke. The drive motor stroke, the extractor motion and the kicker motion are controlled by the control camshaft as noted above. The diverter and the directional control switch are hydraulically connected between the hydraulic piston pump and the seedling tray positioner. The seedling tray positioner stroke limit switches are adjustably set to activate when the extractor is at the last seedling cell in a row of cells in the tray. The limit switch activation activates the diverter reset control cylinder that reverses the direction of motion of the seedling tray positioner and activates the seedling tray drop actuation mechanism. This moves the tray down in the tray holder one row of cells. The diverter reset also stops motion of the seedling tray positioner for one stroke of the drive cylinder so the seedling tray is in position for extraction of the first seedling cell in the new row. After extraction of that first seedling, the seedling tray positioner then moves in the new direction so the extractor may remove the seedling in that row, one seeding at a time.

Objects and Advantages

One object of the present invention is to provide a seedling planting apparatus that is field adjustable to accommodate a variety of seedling tray sizes and configurations.

A second object of the present invention is to provide a seedling planting apparatus that readily adjusts the spacing of the planted seedlings in the field.

A third object of the present invention is to provide a seedling planting apparatus that readily adjusts to plant single or double rows of seedlings, which are staggered in location.

A fourth object of the present invention is to provide a seedling planting apparatus that works with available tractors.

A fifth object of the present invention is to provide a seedling planting apparatus that is lightweight and economical of manufacture.

A sixth object of the present invention is to provide a seedling planting apparatus that is economical in the labor required to plant seedlings.

A seventh object of the present invention is to provide a seedling planting apparatus that continuously moves over the growing field planting seedlings as it is in motion.

REFERENCE NUMERALS IN DRAWINGS

Figure 1:
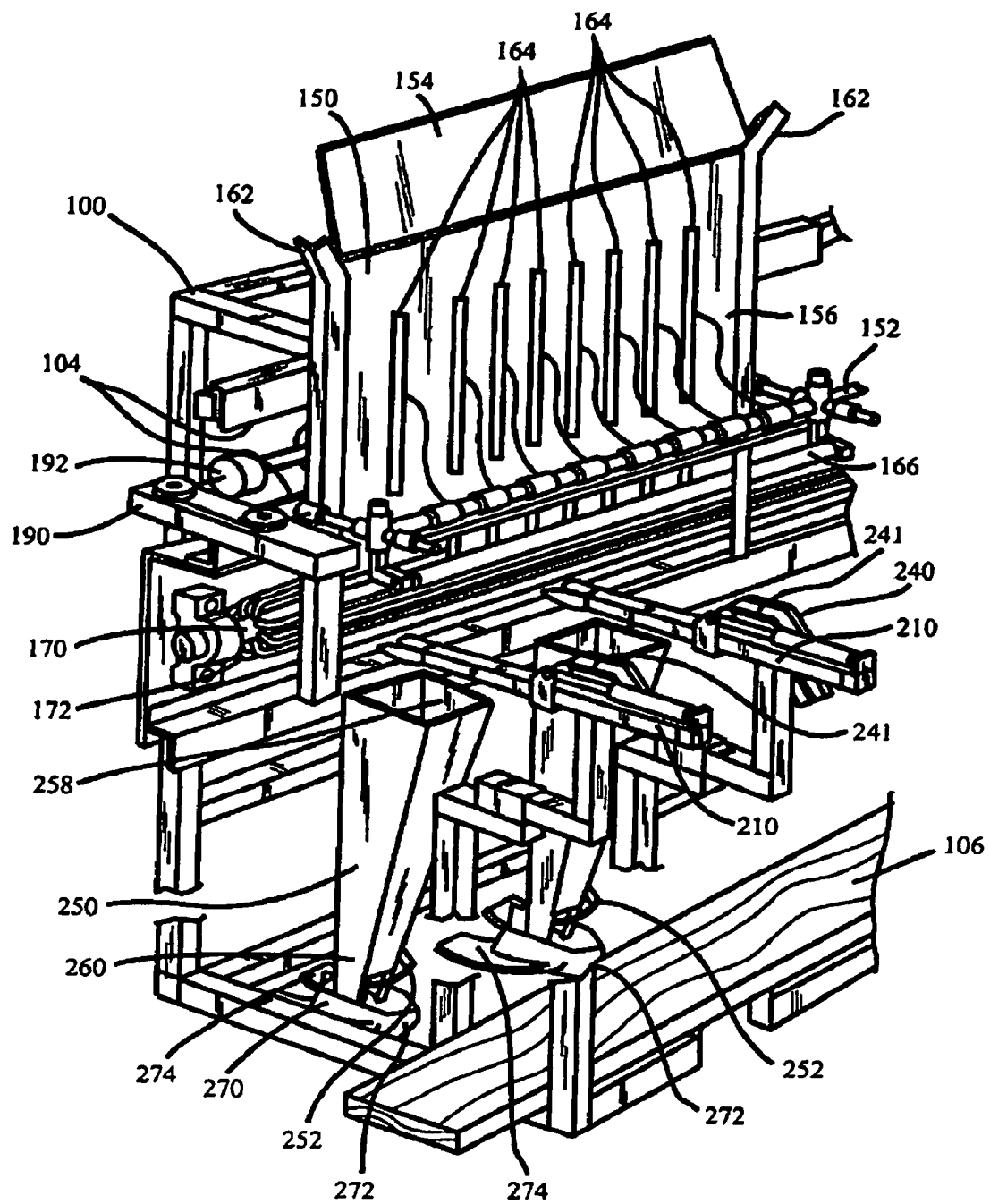
FIG. 1 is an isometric view of one tray holder of the adjustable seedling planting apparatus showing the major parts of the apparatus.

These reference numbers are used in the drawings to refer to areas or features of the invention.
100 Frame
102 Tractor Attachment
104 Tray Holder Roller Attachment edge
106 Working Surface
108 Frame Support Leg
150 Seedling Tray Holder
152 Tray Holder Adjustment Bar
154 Tray Inlet Support
156 Tray Intermediate Support
158 Support Roller
160 Lower Tray Suppport
162 Tray Guide
164 Tray Hold-down Strip
166 Tall Seedling Bender Bar
170 Seedling Tray Advance Mechanism
172 Advance Cage
174 Advance Bar
176 Advance Cage Operating Shaft
178 Advance Cage Anti-reverse Pawl
180 Advance Cage Drive Cylinder
182 Advance Cage Rotation Assembly
190 Seedling Tray Lateral Motion Mechanism
192 Double Rod End Seedling Tray Positioner
194 Seedling Tray Positioner Left Stop Mechanism
196 Seedling Tray Positioner Right Stop Mechanism
210 Seedling Extractor
212 Housing
214 Extension Tube
216 Control Rod
218 Control Rod End
220 Extractor Seedling Handler Blade
222 Seedling Handler Sloping Portion
224 Seedling Handler Converging-Diverging Portion
226 Seedling Handler U-Shaped Spring End
228 Extractor Handler Retaining Pin
230 Extractor Release Bushing
232 Extractor Spring Guide Rod
234 Extractor Release Spring
236 Extractor Drive Mechanism
238 Drive Mechanism Cylinder and Piston
240 Drive Track
241 Drive Track Linear Portion
242 Drive Connector
244 Drive Connector Follower Pin
250 Seedling Guide Chute
252 Seedling Kicker
254 Kicker Operating Shaft
256 Kicker Drive Cylinder
258 Chute Receiving End
260 Chute Kicker End
262 Chute Support
270 Seedling Planting Mechanism
272 Furrow Shaper Shoe
274 Furrow Closure Plate
290 Control Camshaft
292 Camshaft Hydraulic Motor
294 Cam
296 Cam Follower
300 Control System Drive Cylinder Cam Follower Switch
302 Extractor Drive Mechanism Cam Follower Switch #1
304 Extractor Drive Mechanism Cam Follower Switch #2
306 Kicker Drive Cylinder Cam Follower Switch
310 Hydraulic Control Valve
312 Hydraulic Connector
314 Extractor Shut-off Valve
320 Seedling Tray Size Adjustable Control System
322 Double Acting Drive Cylinder
324 Drive Cylinder Stroke Length Adjustment
326 Hydraulic Fluid Reservoir
328 Double Rod End Hydraulic Piston Pump
330 Seedling Tray Positioner Stroke Limit Switch
332 Manual Control Valve
334 Diverter Valve
336 Control Logic
338 Diverter Reset Control Cylinder
340 Hydraulic Directional Control Valve
342 Directional Control Valve Control Cylinder

DETAILED DESCRIPTION OF THE INVENTION

The present invention is an apparatus for planting seedlings from a rectangular tray containing multiple rows of seedling cells in a growing field. The object of the apparatus is to remove the seedlings from the tray in an orderly manner and place the seedlings in soil in orderly rows such that the seedling will grow. The apparatus is towed by a tractor and is powered by the tractor hydraulic system that delivers hydraulic press proportional to the ground speed of the tractor. Tractors come in a large variety of configurations and are common farm equipment, so the tractor is not illustrated or described herein.

FIG. 1 shows a perspective view of a section of the apparatus showing the major components. The complete apparatus contains several sections like the one shown. The components are mounted on the frame (100) and the frame acts to maintain them in their operating relationship. The seedling tray holder (150) supports the trays of seedlings in an essentially vertical position and allows vertical movement of the tray. The trays are moved vertically, one row of seedling cells at a time, by the seedling tray advance cage (172). The tray holder is mounted by rollers to the frame so it may move laterally in response to motion of the seedling tray lateral motion mechanism (190) which is flexibly connected to the outer seedling tray holders on the apparatus. A flexible cable connection is shown in FIG. 1. The cooperative movement of the tray advance mechanism and the tray advance mechanism move a tray one seedling cell at a time from a starting reference point until the last cell in the tray is reached and then the tray is lowered vertically one row and the lateral motion resumed in the opposite direction, one cell at a time. A tall seedling bender bar (166) catches the tops of tall seedlings and keeps them out of the way of the extractors (210). This provides the means for bending seedlings sufficiently tall to impede extractor operation so the extractor blade has unimpeded access to the seedling ball. Two seedling extractors are installed facing the seedling tray. The extractor blades (220) move along a slot in a track (240) that moves the extractor seedling handler blades at an angle to the vertical except for a horizontal linear portion of travel in the slot (241) that moves the blades in and out of the seedling cell in the tray. The reference point(s) for the tray holder are the seedling extractors (210). The extractor enters a seedling tray, grasps the seedling root ball, removes the root ball from the tray, moves the root ball over the seedling guide chute (250) and releases the seedling into the chute receiver end (258). The seedling drops down the chute until it lands on the kicker (252) that is positioned on the guide chute kicker end (260). The seedling planting mechanism (270) is adjustably mounted on the frame to accommodate differing planting filed furrow depths. It has a furrow shaper shoe (272) that forms a small furrow with a cross-section shaped like the seedling ball as the apparatus moves forward. The kicker swings on an operating shaft to dislodge the seedling and drop it into the furrow in the interior of the furrow shaper shoe. The end of the kicker is bent and formed in the shape of the furrow shaper so when the kicker returns to its original position the seedling is up righted in the furrow. The forward motion then allows the furrow closure plates (274) to move the disturbed soil around the seedling in the furrow.

Figure 2:
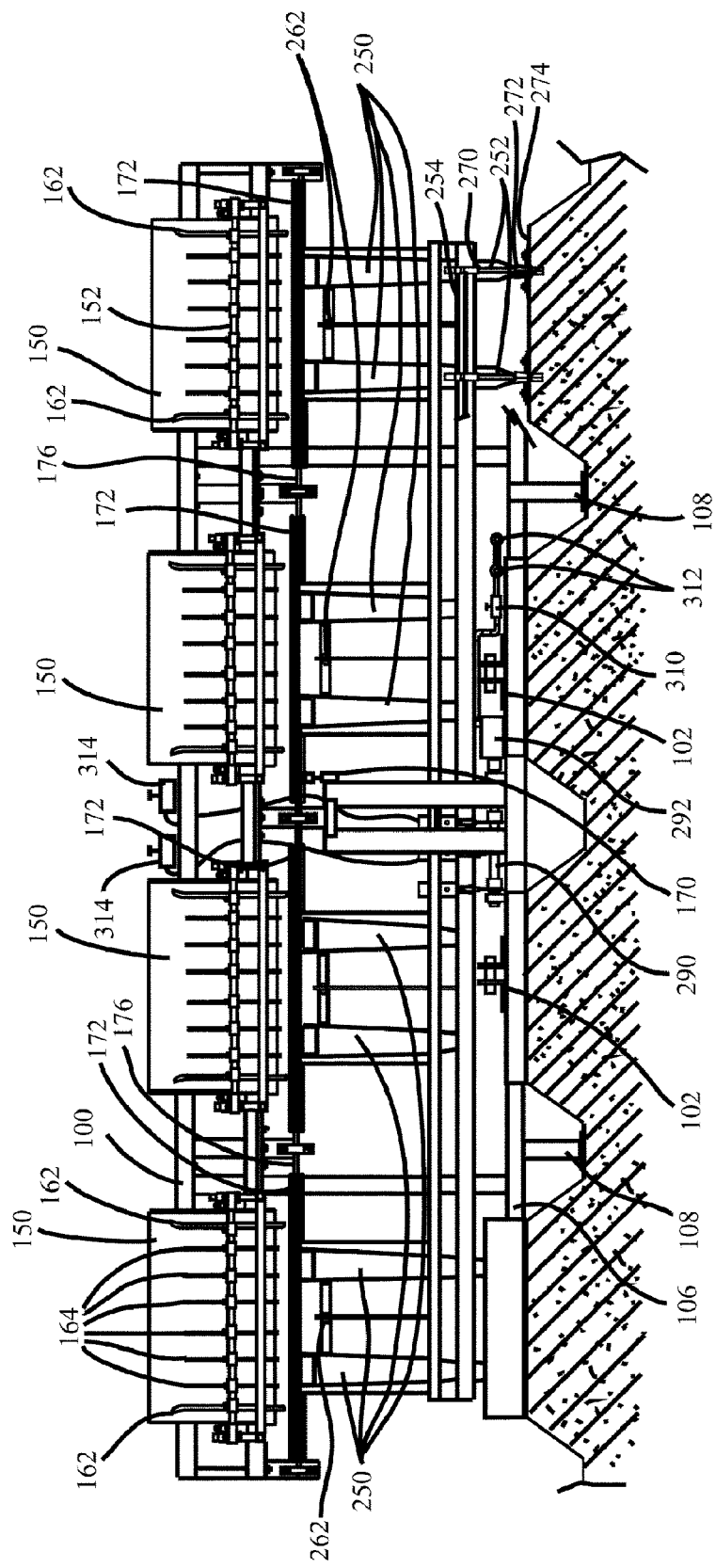
FIG. 2 is a front view of the adjustable seedling planting apparatus.

FIG. 2 is a front view of the preferred embodiment of the present invention giving the arrangement of several of the components. The frame is cut away at several locations to show the arrangement of certain of the apparatus components. The apparatus has 4 tray holders (150) on a frame with 2 support legs (108), and 8 seedling guide chutes (250) mounted on the frame by the chute supports (262). The chutes are open at the receiving end (258) and terminate in the kicker (254) at the chute kicker end. The seedling extractors are not shown in this figure for clarity of the other features. The figure also shows the 4 seedling tray advance cages (172) connected by the advance cage operating shaft (176). The advance cage advance mechanism frame (170) is also shown.

The tractor tows the apparatus by connecting a 3-point hitch to the tractor attachments (102), 2 of which are shown in the figure. This type of hitch is common on tractor-towed farm equipment and is not illustrated here. The locations of the control camshaft (290), its hydraulic motor (292) and the hydraulic control valve (310), and hydraulic quick-disconnect connectors (312) are also shown. The tractor hydraulic system is connected to the hydraulic motor through this connector. The tractor hydraulic system pressure varies with the speed of the tractor so the speed of the hydraulic motor will vary with the tractor speed as further reduced by any throttling that the hydraulic control valve.

The seedling tray holders in FIG. 2 are shown without the lower tray supports in order to show the arrangement of the seedling tray advance mechanism. The tray holders are shown with the tray holder adjustment bar (152) containing left and right tray guides (162) and 6 tray hold-down strips (164) per holder. The tray holders are empty of seedling trays in this figure.

There is a cut-away view with the frame cut away at the kicker end (260) of the chutes on the right side of FIG. 2. This shows the arrangement of the seedling planting mechanism (270) that includes the seedling kicker (252), the kicker operating shaft (254), the furrow shaper shoe (272) and the furrow closure plates (274).

Figure 3:
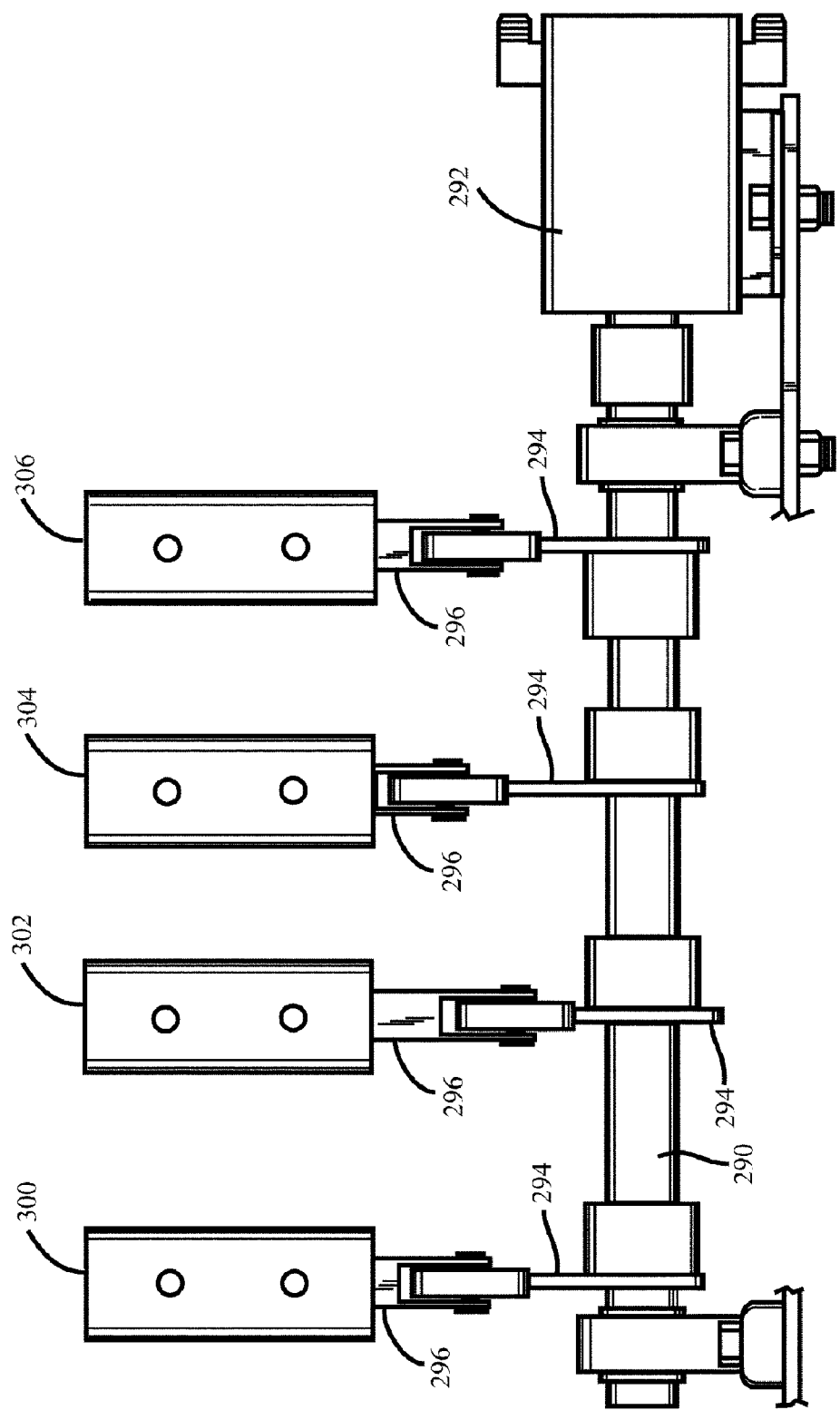
FIG. 3 is a side view of the adjustable seedling planting apparatus control cam and camshaft motor.

FIG. 3 shows the side of the control camshaft (290) that controls the timing of the components of the apparatus. The components controlled, directly or indirectly, are the lateral and vertical motion of the tray holder, the removal of seedlings from the tray by the extractor, and the planting of the seedlings by the kicker. The camshaft motor (292) drives the shaft that has 4 cams (294) attached. As the cams rotate with the shaft, the cam followers (296) respond to the shape of the cam by moving the follower switches. There is a follower switch for the Drive Cylinder (300), 2 for the Extractor Drive Mechanism (302, 304) and 1 for the Kicker Drive Cylinder (306). The drives are connected to the switches by piping and/or flexible hoses The connections between the follower switches and the extractors contain a shut-off valve (314), shown in FIG. 2, to enable planting seedlings in a single row by shutting the valve and stopping operation of 1 of the 2 extractors serving each tray holder. When in operation planting a double-row, the spacing of the seedlings may be staggered between the rows by appropriate camshaft timing. Having the kicker cam double lobed will provide 2 kicker operations per apparatus cycle. If the cams for the extractors at each tray holder are timed to operate one extractor per each kicker operation, one kicker per tray holder will be empty on each kicker operation, staggering the seedlings. Staggering means in each row the planted seedlings will not be opposite the seedling in the other row but opposite a space between seedlings in the other row.

The hydraulic motor is connected by a quick disconnect connector (312), shown in FIG. 2, to the tractor hydraulic system so that the motor turns at a speed proportional to the speed of the tractor. A throttle control valve (310) allows for manually adjusting the motor speed relative to the tractor speed. The cams are adjustably connected to the camshaft and the camshaft is connected to the motor such that the cams rotate at the speed of the motor. The cam followers move in response to the cam rotations such that they activate the follower switches at each rotation of the camshaft with the timing of the cam follower motion determined by the configuration of the cam surface. A cycle of the apparatus is one rotation of the camshaft. The follower switches control the flow of fluid, compressed air or hydraulic fluid, to the piston cylinders of the drive cylinder, the extractor drive mechanism cylinder and piston, and the kicker drive cylinder. The drive cylinder (322) is shown on FIG. 7, the extractor drive mechanism (238) is shown on FIG. 4, and the kicker drive cylinder (256) is shown on FIG. 4. Adjusting the throttle control valve may vary spacing of the seedlings in the ground. Throttling the valve varies the hydraulic pressure to the camshaft motor that in turn varies the speed of the camshaft that in turn will vary the speed of the cycles of removal and planting of seedlings relative to the tractor forward speed.

Figures 4, 4A:
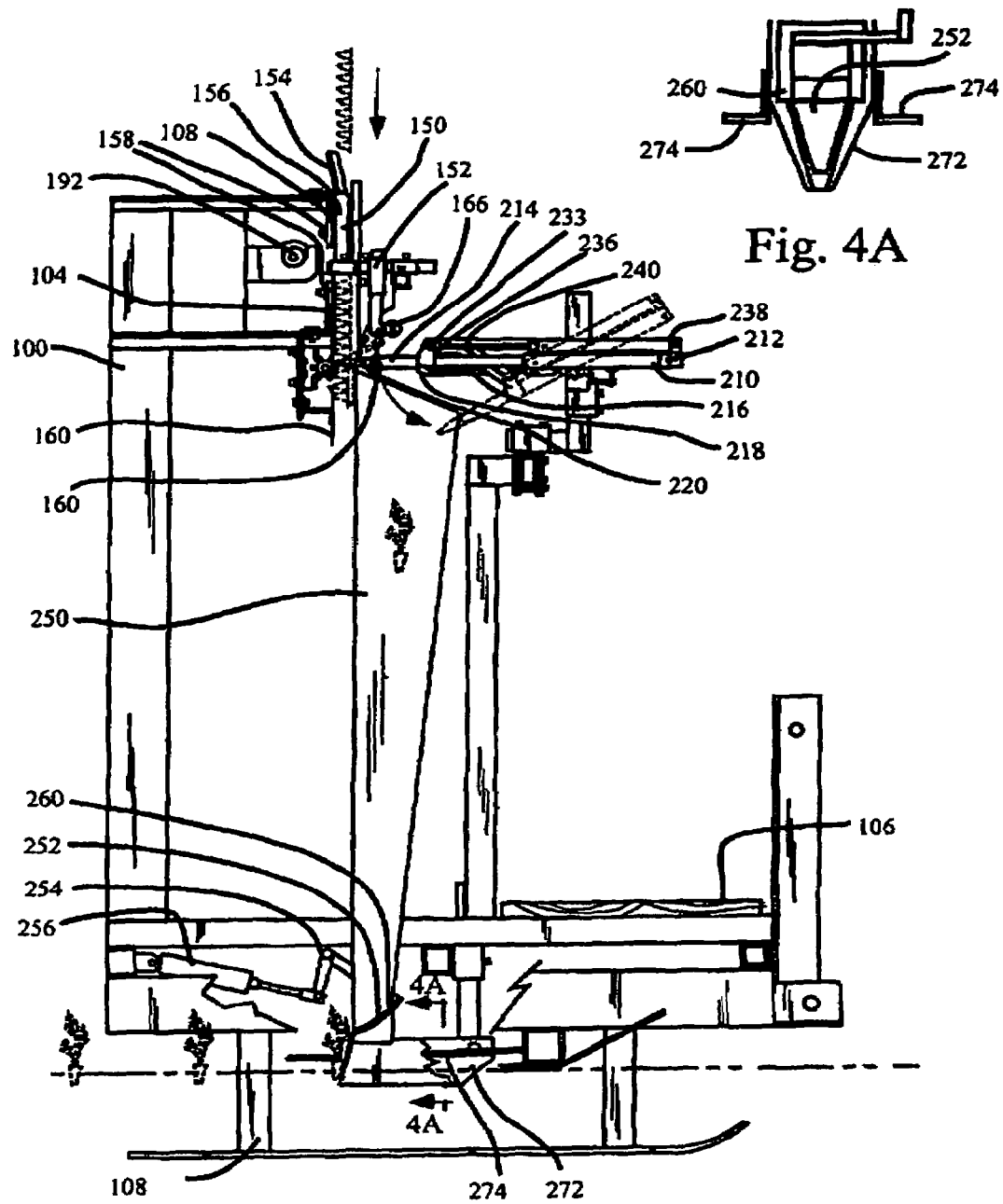
FIG. 4 is a side view of the adjustable seedling planting apparatus showing the seedling extractor and planting mechanism in operation. This view shows the extractor in position to drop a seedling extracted from the tray into the chute.
FIG. 4A is a cut-away view of the seedling planting mechanism from the position 4A as shown on FIG. 4. This view shows the kicker mechanism in the chute slot and extending into the planting mechanism.

FIG. 4 is a side view of the apparatus showing the frame (100). Portions of the frame are cut away in this view to show details of the apparatus components. One of the two support legs (108) is shown. These carry the weight of the apparatus and allow it to be towed behind a tractor. The support leg shown has a skid runner which glides in the furrow of the planting field.

The seedling tray holder (150) consists of an inlet support (154), an intermediate support (156) and a lower support (160). FIG. 4 shows the holder with 1 seedling tray in the holder being held on the bottom by the intermediate and lower supports. The rectangular tray is also supported at the tray edges by the tray guides (162), shown in FIG. 2, and supported on the top by the tray hold-down strips (164), also shown in FIG. 2. FIG. 4 shows a second tray being inserted into the tray holder and guided by the upper support. An operator or operators standing on the working surface (106) would insert this second tray so the apparatus may plant seedlings continuously.

The tray holder intermediate support is on rollers (158) that ride in the roller attachment edges (104) attached to the frame. This allows the intermediate support to move in the lateral direction, which is left and right in the front view of FIG. 2 or into and out of the page in the side view of FIG. 4. The upper and lower supports are attached to the intermediate support and move with the intermediate support. The tray holders move laterally the distance of one tray cell. All the apparatus tray holders move together by being connected by the tray holder adjustment bars (152), attached as shown in FIG. 2. The lateral motion is controlled by the seedling tray lateral motion positioner (192), shown in FIGS. 1 and 4, that is flexibly connected as shown in FIG. 1. The positioner is controlled by the seedling tray size adjustable control system (320), shown in FIG. 7.

The extractor (210) removes one seedling at a time from the seedling tray and moves it to the lower position shown by dotted lines in FIG. 4. This lower position is over the chute receiving end (258), where the seedling is released and drops into the chute as shown in the figure. The seedling tray holder then moves the seedling tray one seedling cell either to the left or right, depending on which side of the seedling tray the seedling removal began. The extractor then returns to the seedling extraction position, shown by solid lines in FIG. 4, and removes the next seedling. In the event there are seedlings that have grown so tall as to interfere with extractor operation, a tall seedling bender bar (166) is provided to catch the top of the tall seedling and keep it from interfering with the extractor operation. The extractor consists of a housing (212) an extension tube (214), a control rod arranged with an adjustable fixed length (216), a control rod end arranged to travel in a slot in the extension tube, and extend beyond the slot when the extension tube is fully in the housing (218), a seedling handler (220), a drive mechanism (236) with a cylinder and piston (238) that is connected (242) to the housing and extension tube. The connection to the extension tube has a long pin (244) that has its end inserted in a slot in the drive track (240). The pin moving in the drive track slot guides the extractor housing and extension tube in a sloping direction as it moves up and then when it is horizontal, it guides it in linear motion toward and away from the seedling tray. The extractor has a seedling handler (220) inside the extension tube. The handler has two normal positions, open and closed. It is in the open position during the linear motion into the seedling tray cell and moves to the closed position when fully inserted in the seedling cell, grasping the seedling ball. The handler remains in the closed position until it is near the end of downward travel, and located over the chute receiving end where it opens. It then remains in the open position for the upward travel and linear travel into the next seedling tray cell.

Figure 5A:
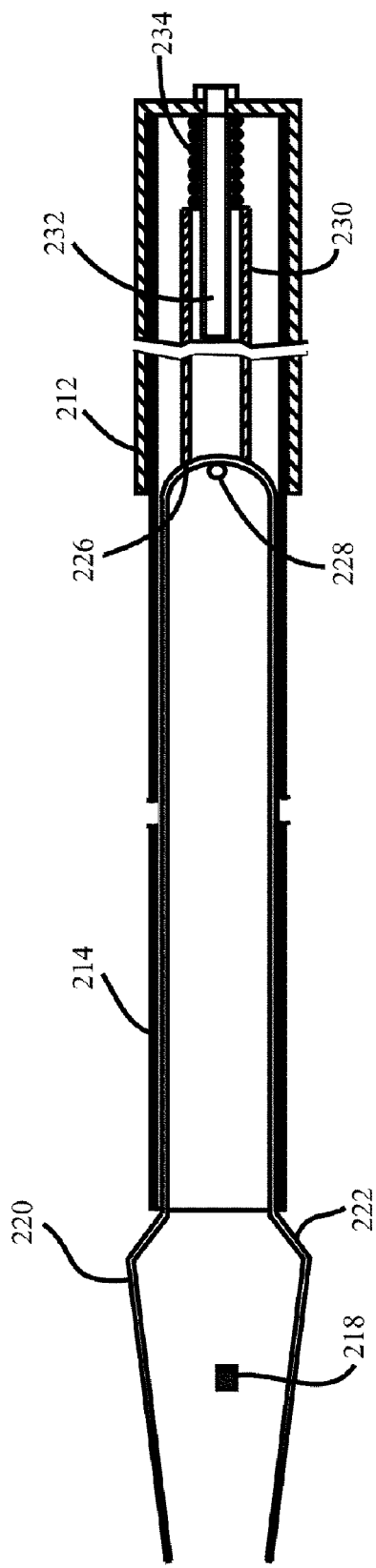
FIGS. 5A and 5B are bottom view cut-away views of the seedling extractor mechanism taken on the centerline of the extractor mechanism. These views show the extractor handler blade in the open position to engage a seedling in a tray or drop the seedling into the chute, and in the closed position to retain a seedling to remove it from the tray and move it to the mouth of the chute.
Figure 5B:
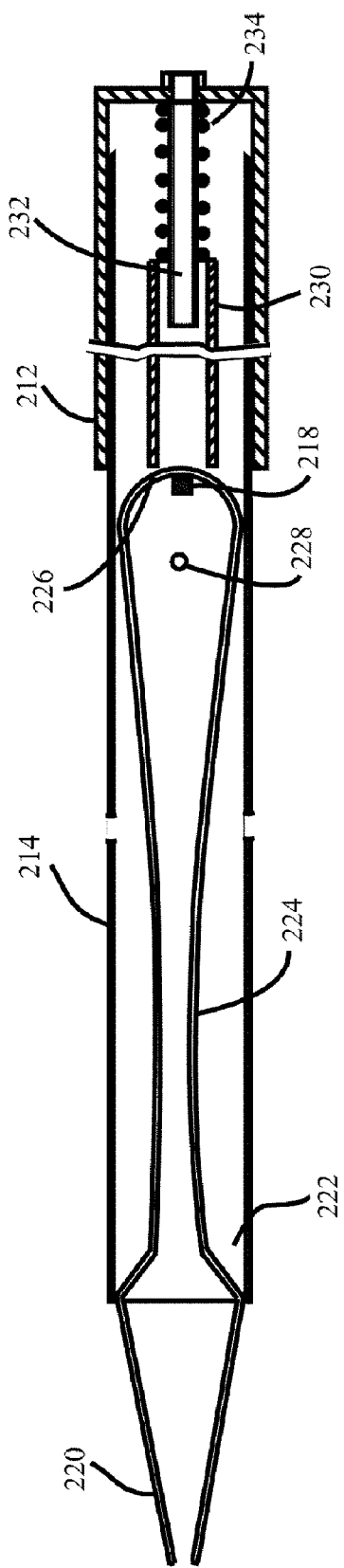

The opening and closing of the extractor handler blade is illustrated in FIGS. 5A and 5B. These figures show the extractor housing (212), the extension tube (214), the two sides of the seedling handler blade (220), the handler retaining pin (228), the control rod end (218), the release bushing (230), the spring guide rod (232) and the release spring (234). The view of FIGS. 5A and 5B is a bottom view cross-section taken at the centerline of the extractor. In FIG. 5A the handler blades are in the open position, and in FIG. 5B the handler blades are in the closed position. The figures show the handler blade is configured with a blade portion (220), a sloping portion (222), a converging-diverging portion (224), and a unshaped spring end (226).

Starting with the handler in the open position as shown in FIG. 5A, and in the down position as shown in dotted lines in FIG. 4, a cycle of the extractor handler occurs as follows. The drive mechanism (236) moves to remove the extension tube (214) from the housing (212). This moves the extension tube opening in the upward direction along the drive track (240). As this motion occurs, the fixed length control rod moves the control rod end in the extension tube slot relative to the extension tube. Once the housing is horizontal, the motion moves the open extractor linearly into the seedling tray cell opposite the extractor. Near the bottom of the seedling tray cell, the control rod end contacts the blade u-shaped spring end as shown in FIG. 5B and the motion slides the handler blade into the extension tube. This motion moves the sloping portion of the handler blades (222), shown in FIGS. 5A and 5B, into the tube causing the handler to move into the closed position as shown on FIG. 5B. In this position the handler blades seedling grasping portions have retained the seedling ball. The drive mechanism then reverses direction, acting to move the extension tube back into the housing and therefore moving the handler and the seedling ball out of the tray cell. At the end of the linear motion portion of the track, the extractor moves downward until the seedling is just above the chute receiving end.

The seedling extractor release mechanism has a release bushing (230), a spring guide rod (232), and a release spring (234) as shown on FIGS. 5A and 5B. When the drive mechanism moves the extension tube into the housing and nears the end of its motion, the release bushing compresses the release spring. The spring force eventually causes the bushing to have enough force to move the handler in the out direction from the extension tube. The sloping portion of the handler blades assists in this motion and the blades spring into the open position. The release bushing and spring are sized so this occurs towards the lower end of the track slot. While the handler blades are in the open position, the motion of the control rod end (218), as shown in FIG. 5A, has extended beyond the end of the extension tube and the vertical portion of the control rod end then assists in removing the seedling from the handler blade.

Figure 6:
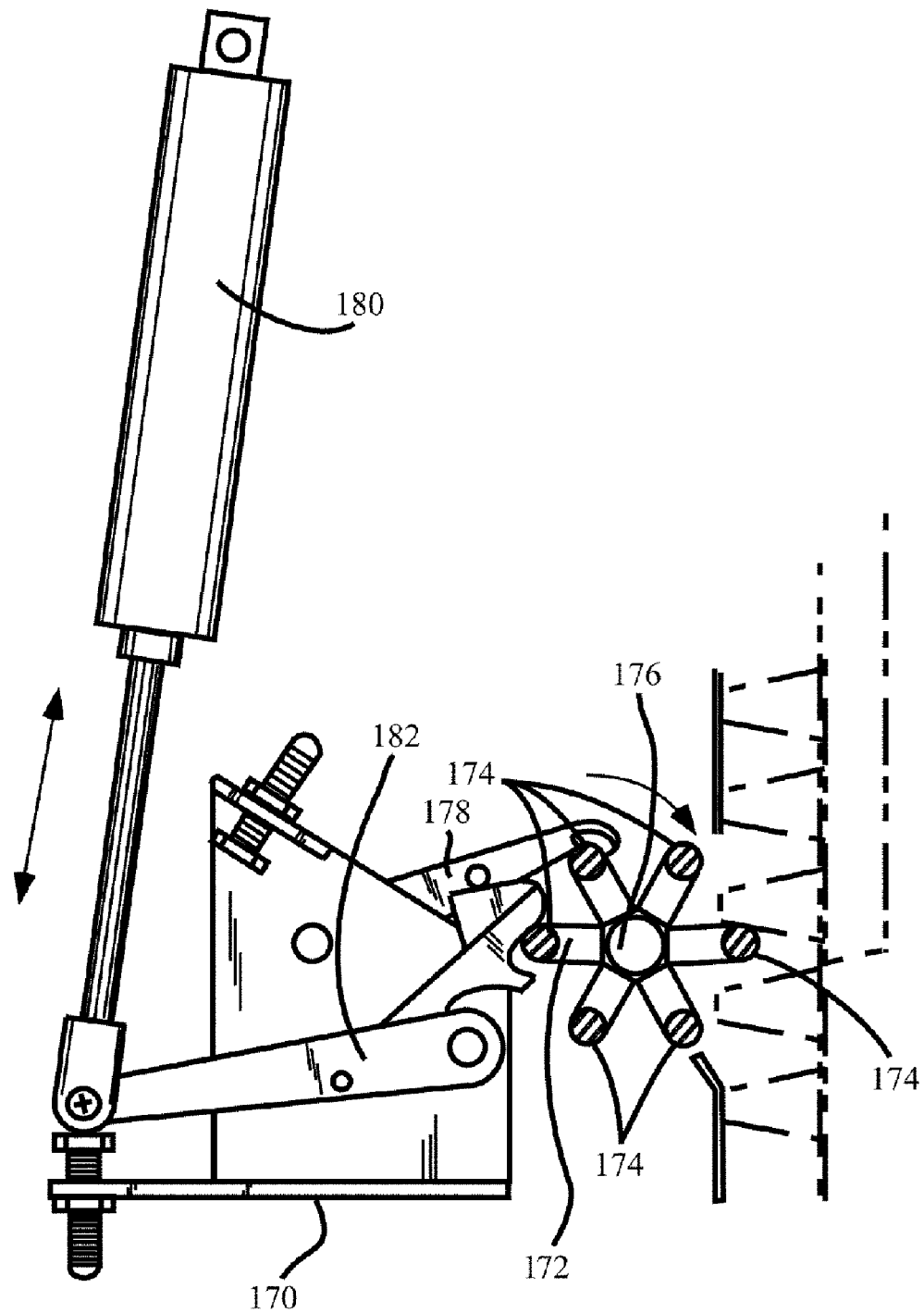
FIG. 6 is a side view of the adjustable seedling planting apparatus seedling tray advance mechanism.

The seedling tray advance cage (172), shown in FIGS. 2 and 4, supports the seedling tray and lowers the tray one row at a time. The advance mechanism is shown in more detail in FIG. 6. It has an advance cage (172) with a multiplicity of advance bars (174), an advance cage operating shaft (176) arranged to connect the advance cages associated with each tray holder so they move simultaneously. The mechanism has a drive cylinder assembly (180), and an advance cage rotation assembly (182) that has one pawl to drive the advance cage and an anti-reverse pawl (178) to prevent backwards motion of the cage. The rotation assembly is assembled on a frame (170) that also contains adjustable stops for the cylinder motion. The drive mechanism is arranged so one cycle of the drive cylinder causes the cage rotation assembly to engage an advance cage advance bar, and by moving the bar rotate the advance cage operating shaft which connects all the advance cages. The advance cage bars are arranged such that their axis is parallel to the tray intermediate support contact surface, and further arranged such that one bar of the advance cage projects above the plane of the surface of the tray intermediate support. A seedling tray held in the seedling tray holder as shown in FIGS. 4 and 6 is supported along a row of seedling cells at the bottom side of the cells by the protruding advance cage bar. Rotation of the advance cage operating shaft by a cycle of motion of the drive cylinder assembly will rotate the advance bar such that the projecting bar moves below the plane of the surface of the tray intermediate support as the next bar of the cage forcibly touches the seedling cell on the top side such that the tray is moved down as the next bar moves into a position to project above the plane of the surface of the tray intermediate support and support the next row of seedling cells on the bottom side.

This seedling tray advance mechanism operates in conjunction with the seedling tray lateral motion mechanism through the seedling tray size adjustable control system. The timing of the tray size adjustable control system is in turn controlled by the control camshaft as previously described.

Figure 7:
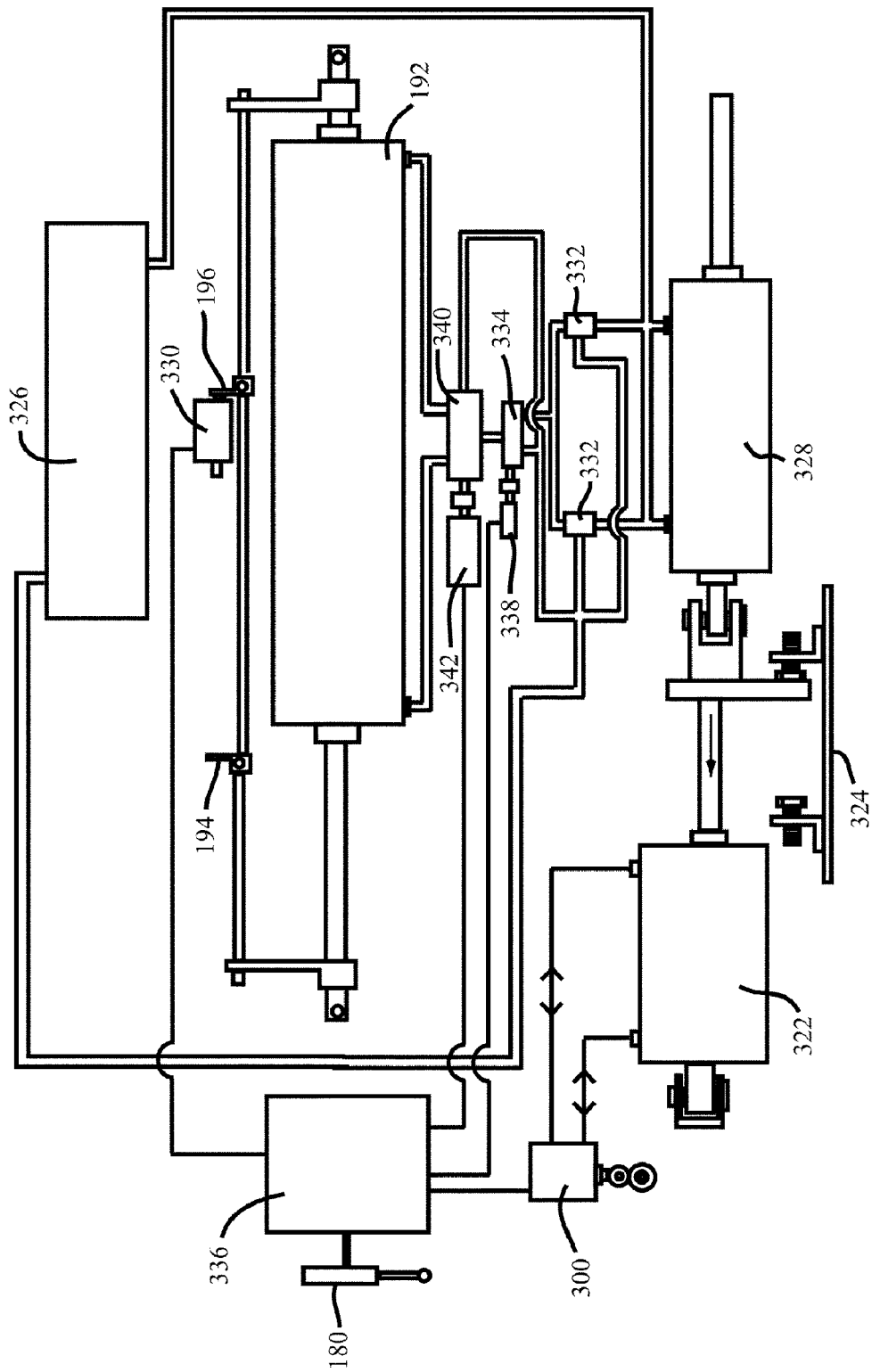
FIG. 7 is a schematic diagram of the Sequencing and Seedling Tray Size Adjustment Control System.

The seedling tray size adjustable control system is shown in FIG. 7 and has a double acting drive cylinder (322), a drive cylinder stroke length adjustment (324), a hydraulic fluid reservoir (326), a hydraulic double rod end hydraulic piston pump (328), a double rod end seedling tray positioner (192), a seedling tray positioner stroke limit switch (330), two manual control valves (332), a diverter valve (334), a diverter reset control cylinder (338), a hydraulic directional control valve (340) and a directional control valve control cylinder (342). The control cylinders are controlled by electrical/electronic and/or pneumatic signals from a controller system (336) that also provides a control signal to the seedling tray advance mechanism drive cylinder (180) when the seedling tray is aligned with the seedling extractor at the end of a row of seedlings. The control system components are located on the upper portion of the frame except for the seedling tray positioner, which is supported behind the tray holders as shown in FIG. 1. This location of the components is behind the extractor valves (314) shown in FIG. 2.

The drive cylinder reciprocating motion is controlled by the seedling planting apparatus control camshaft follower switch (300). The length of the motion is limited by adjustable stops on the stroke length adjustment (324). The drive cylinder moves the hydraulic piston pump (328). The pump is fluidly connected to the hydraulic fluid reservoir and the seedling tray positioner. When the pump (328) moves due to a stroke of the drive cylinder, a substantially repeatable volume of hydraulic fluid is delivered to the seedling tray positioner (192) at each stroke. This volume is set by the stroke length adjustment (324) so the seedling tray positioner is moved the distance between one seedling tray cell at each stroke. This allows the extraction of one seedling from each tray by each extractor before the tray holder is moved the distance of one seedling tray cell by the next drive motor stroke to align the tray with the extractors to permit removing the next seedling. The drive motor stroke, the extractor motion and the kicker motion are controlled in a coordinated manner by the control camshaft as noted above to produce the desired planted seedling spacing. The follower switches of the control camshaft control these devices by a controlling the flow of fluid to the drive mechanisms. The fluid may be compressed air or hydraulic fluid.

The diverter (334) and the directional control switch (340) are hydraulically connected between the hydraulic piston pump and the seedling tray positioner. The seedling tray positioner stroke limit stop mechanisms (194, 195), shown in FIG. 7, are adjustably set to activate the positioner stroke limit switch (330) when the extractor is at the last seedling cell in a row of cells in the tray. The limit switch activation activates the diverter reset control cylinder (338) that reverses the direction of motion of the seedling tray positioner and this also activates the seedling tray drop mechanism drive cylinder (180) through the control system (336) to move the tray down in the tray holder one row of cells. The diverter reset (338) also stops motion of the seedling tray positioner for one stroke of the drive cylinder by diverting the hydraulic fluid to the reservoir (326) so the seedling tray is in position for extraction of the first seedling cell in the new row at the extractors next cycle. After extraction of that first seedling, the seedling tray positioner then moves in the new direction so the extractor may remove the seedling in that row, one seeding at a time. Two manual control valves (332) are also provided to permit manually aligning the positioner.

The seedlings released by the extractor, as shown in FIG. 4, fall into the chute receiving end (258), located below the seedling extractor. The chute (250), guides the seedlings falling from the extractor to the kicker end (260) of the chute. The chute is configured with a reduction in the cross-sectional area with distance from the receiving end. The kicker end has a side slot into which the movable kicker is installed as shown in FIGS. 2, 4, and 4A. The kicker (252) is a blade configured with an operating lever arranged to move the blade, an operating shaft (254), and a drive cylinder (256). The drive cylinder is arranged to rotate the kicker operating shaft (254) as shown on FIG. 2, which operates all kickers simultaneously. The drive cylinder rotates the operating shaft and swings the kicker blade to the planting position, and then it moves in the opposite direction so the kicker blade is returned to the seedling holding position.

The kicker (252) has a horizontal portion and a vertical portion as shown on FIG. 4. The horizontal portion is configured to fit within the chute cross-section at the upper end of the kicker slot so a seedling dropping into the chute will be retained by the kicker blade horizontal portion. The vertical portion is configured approximately in the configuration of a seedling tray cell side. Thus the swing motion of the kicker blade out of the chute slot moves the horizontal portion to an angle causing a retained seedling to drop from the chute into the soil furrow below. The seedling root balls are heavy with water, so the seedling falls root ball first. The kicker return motion brings the vertical portion in contact with the dropped seedling as shown in FIG. 4, to place it in the vertical position in the soil.

The seedling planting mechanisms (270) are at each seedling chute kicker end, and have a furrow shaper shoe (272) and multiple furrow closure plates (274) as shown by FIG. 4A which is a view of the planting mechanism from the location shown in FIG. 4. The furrow shaper shoe is configured with a similar cross-section to a seedling tray cell in the direction of motion of the apparatus. This provides a furrow with a cross-sectional area essentially in the shape of a seedling ball. The shaper blades have a gap between the inside surfaces located just below the chute kicker section also configured in the shape of a seedling tray cell. A seedling which has just been dropped from the chute will fall in this gap and the vertical portion of the kicker will then enter the gap and align the seedling between the inside surfaces of the planting mechanism furrow shaper shoe. The furrow closure plates then guides the soil that has been displaced by the furrow shaper shoe back into the furrow to complete the planting of the seedling.

ADDITIONAL EMBODIMENTS

The adjustable tray size seedling planting apparatus is flexible in layout and may be sized to permit use on a variety of field furrow configurations.

The adjustable tray size seedling planting apparatus controls may be implemented using a variety of power sources to obtain the same functional responses. The use of the tractor hydraulic system may be supplemented or replaced by pneumatic, electrical, or electronic controls.

Operation

The adjustable tray size seedling planting apparatus is operated by first connecting the apparatus to a tractor using a 3-point hitch. The apparatus is connected to the tractor hydraulic system by the quick disconnect fixtures and the control valve is opened.

The seedling tray holders are adjusted to fit the seedling tray size in use, and the seedling trays are installed in the holders with the first row of seedling cells resting on a bar of the seedling tray advance mechanism advance cage. The tray cell spacing configuration is set using the control system stroke length adjustment and checked by manually advancing the tray using the manual control valves. The extractors are then aligned at the first seedling in the first row using these manual valves. Two rows of seedlings between planting field furrows are planted if the control valves for all extractors are in the open position. If desired to plant only one row, the control valve for the second extractor serving each seedling tray holder is placed in the closed position.

The apparatus is then towed over the growing field, planting seedlings, and the seedling spacing may be adjusted to that desired using the hydraulic control valve.

What is claimed is:

1. A seedling extractor apparatus for removing seedling root balls from a seedling tray configured with multiple rows of seedling growing cells and arranged on a vertical holder such that the seedling cells are horizontal comprising:
   a. a housing, an extension tube with an operating end and an insertion end, the insertion end slidably installed in the housing, an inside wall and an outside wall, a top side and a bottom side, the bottom side containing a longitudinal slot with a slot entrance and a slot end, and a retaining pin hole, a control rod, a control rod end, an extractor seedling handler slidably installed in the extension tube operating end with a seedling end and a u-shaped spring end, the seedling end with a first blade and an opposing second blade, each opposing blade having an end, a seedling grasping portion, a sloped portion, a u-shaped spring end, the u-shaped spring end springedly connected in a u-shape, an extractor handler retaining pin, a drive mechanism, the drive mechanism controlled by the seedling control camshaft, and a release mechanism;
   b. the extractor seedling handler blade sloped portion arranged for two normal positions, a closed position where the blade is slidably within the extension tube inside wall the sloped portion springedly pressing against the inside wall such that the opposing blade seedling grasping portions are positioned such that the ends converge and substantially touch, and an open position where the blade is arranged with the sloped portion outside the extension tube, the sloped portions apart such that the opposing blade seedling grasping portions move apart wherein the ends diverge, the retaining pin arranged such that the spring end sliding motion within the extension tube is limited wherein the blade is retained within the extension tube in the open position;
   c. the seedling extractor drive mechanism with a drive cylinder and piston, a drive track with a slot arranged with a linear portion and a sloping portion, and two drive connectors, the first drive connector on the housing and the second on the extension tube arranged to move the seedling extractor extension tube relative to the housing with motion of the drive mechanism and arranged such that a follower pin on the extension tube drive connector is confined within the slot in the drive track such that the motion of the seedling extractor extension tube follows the shape of the slot in the drive track wherein as the drive mechanism moves to extend the portion of the extension tube out of the housing, the motion moves the extension tube in a slope up to a horizontal position and further drive mechanism motion moves it on the linear portion such that the seedling extractor blade ends in the open position may enter a seedling cell of a tray in the tray holder, and the continued extension tube linear motion causes the control rod end to contact the blade u-shaped spring end and slidably move the blade inside the extension tube such that the spring force of the blade sloped portion on the extension tube inside wall moves the opposing blade seedling grasping portions to the closed position such that the seedling ball is confined within the blade seedling grasping portions, wherein as the drive piston moves in the opposite direction, it retracts the extension tube and the linear motion removes the extraction blade ends from the seedling cell, and the seedling ball is removed from the tray cell until the drive mechanism linear motion completes the linear motion portion and further motion slopes the extension tube in the downward direction; and
   d. the seedling extractor release mechanism having a release bushing, a spring guide rod and a release spring arranged such that as the drive mechanism moves the extension tube towards the lower end of the track slot the release bushing compresses the release spring and the spring force causes the bushing to contact the extractor blade spring end, the resulting force of the bushing on the blade slidably extending the blade in the extension tube towards the open position until the blade spring end contacts the retaining pin, such that the opposing blade seedling grasping portions are in the open position, and as the drive mechanism moves the extension tube towards the lower end of the track slot, the seedling extractor control rod end moves past the extension tube slot end to contact the seedling such that the seedling is removed from the extractor blade seedling grasping portions.

2. A seedling extractor apparatus for removing seedlings from a seedling tray configured with multiple rows of seedling growing cells and arranged on a vertical holder such that the seedling cells are horizontal as in claim 1 further comprising a tall seedling bender bar located above the extractor and arranged such that seedlings sufficiently tall to impede extractor operation are bent in the upward direction by the bender bar wherein the extractor blades have unimpeded access to the seedling ball.

* * * * *